3,352,023
METHOD OF MEASURING AND/OR CONTROL-
LING THE RELATIVE MOVEMENT OF TWO
MOVED BODIES
Gunther Budnick, deceased, late of Darmstadt, Germany,
by Thea Budnick, heir and legal representative of minor
heirs of said Gunther Budnick, Heinrichstrasse 191,
Darmstadt, Germany
Original application Feb. 17, 1959, Ser. No. 793,843, now
Patent No. 3,204,532, dated Sept. 7, 1965. Divided and
this application May 20, 1965, Ser. No. 457,527
Claims priority, application Germany, Feb. 24, 1958,
B 47,961
2 Claims. (Cl. 33—179.5)

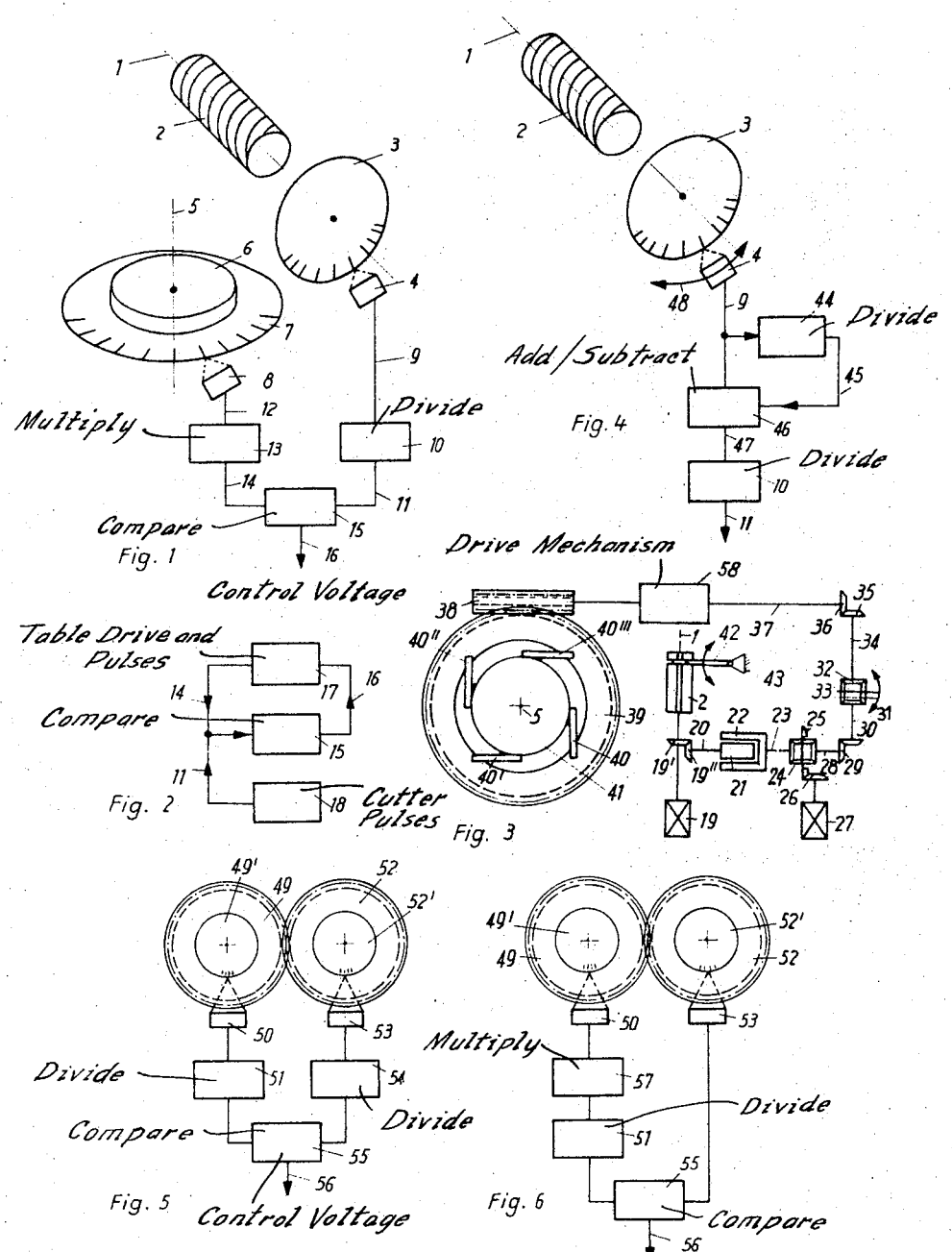

ABSTRACT OF THE DISCLOSURE

A method of gauging the rotary movement of meshing toothed wheels wherein separate pulse trains are generated by each of the wheels, the repetition rate of the pulses in each pulse train being varied in accordance with the number of teeth on the wheels, and then electrically comparing the pulse sequences so generated to provide a guage signal.

---

This application is a division of my copending U.S. patent application Serial No. 793,843, filed February 17, 1959, now Patent No. 3,204,532, and is entitled to the priority date thereof.

It is known that two or more movements can be brought into dependency with one another in that pulse sequences, which may be obtained from the two movements by the scanning of divisions thereon, are compared with the aid of electric means (electronic means). Reciprocal deviation produces a control quantity by which one movement is re-controlled or re-adjusted in accordance with the amount and direction of same, e.g. with the aid of electric or hydraulic gears. This is continued until a synchronism of both pulse sequences is achieved.

It is an object of the present invention to improve this method with respect to both the measurement and the control. The invention substantially consists in that the produced trains of pulses corresponding to the movements can be varied with respect to their repetition rate or frequency by means of electric dividers or multiplicators prior to the comparison thereof and prior to the obtaining of the control quantity.

In the following there will now be described the practical application of this method and of the basic invention with reference to the example of a hobbing machine gear, as well as to the example of a one-flank hobbing gauge for toothed wheels. Further features of the invention will also be described in particular.

In the drawings the invention is shown in a schematical representation with reference to several embodiments.

In these drawings:

FIGURE 1 shows the basic arrangement of the measuring portion up to the production of the control quantity with reference to the example of a hobbing machine gear;

FIGURE 2 shows the control circuit by way of a block diagram;

FIGURE 3 schematically shows the gear mechanism of a hobbing machine with a number of engaging possibilities for regulating any motional deviations or errors;

FIGURE 4 shows part of FIGURE 1 with the supplement for obtaining additional pulses;

FIGURE 5 shows measurement apparatus which can be used to develop basic measuring signals or impulses; and, FIGURE 6 shows a modified type of embodiment of the apparatus shown in FIGURE 5.

Referring now to FIGURE 1 there are shown in a schematical representation component parts of a hobbing machine gear which are important for obtaining a proper understanding of the invention; the hob milling shaft or spindle 1 with the hobbing head or cutter 2, the shaft of the workpiece 5 with the workpiece 6. Both shafts are provided with circle graduations 3 or 7 respectively, with e.g. 10,000 or 50,000 graduation or indexing intervals distributed along the circumference. This corresponds respectively to an indexing interval of 130″ or 26″ (seconds of arc) as regards the table with the workpiece and the cutter. If a medium number of teeth are on the wheel to be hobbed, i.e., amounting to 100, the indexing interval again with respect to the table would be respectively 1.3″ and 0.26″ (seconds of arc). The scanning of these divisions is effected with the aid of the devices 4 and 8. Several of these devices, as has already been proposed hereinbefore, may be arranged in spaced relation around the circumference of each of the graduated circles 3 and 7 in order to increase the accuracy, and to compensate for eccentricities in the divisions. In this connection reference is made to my copending U.S. patent application Serial No. 793,842, filed February 17, 1959, now U.S. Patent No. 3,070,700. In the case of optical divisions and an optical, i.e. photoelectric scanning, especially with the aid of crossing lines, the expenditure will be a particularly small one. However, there may also be employed other, e.g. magnetic divisions.

The scanning operation, in accordance with the angular velocity of the indexing discs, respectively delivers one sequence of pulses for each disc. One sequence, i.e., that of the cutter, flows in line 9, while the sequence of the table flows in line 12. With respect to a predetermined number of teeth of the wheel to be hobbel there will result a fixed transmission, which is set on the machine, between the shafts 1 and 5 and, consequently, a predetermined relationship between the pulse sequences. By suitably selecting the number of indexing intervals of the divided circle an equality of the pulse frequencies may be achieved. For obtaining this equality, pulse dividers or multiplicators are inserted in the lines 9 and 12, in accordance with the invention, as is denoted by the units 10 and 13. In the case of a number of teeth amounting to e.g. 100, and in the case of a single-thread hobbing machine, and when employing uniform indexing discs 3 and 7 it is possible to achieve an equality of the pulse repetition frequencies with the aid of a divider 10, transferring only every 25th pulse, and of a multiplicator generating four times as many pulses.

In this case, of course, there may also be employed other number combinations. Thus, for example, the multiplicator may be omitted when the divider is adjusted to the number of teeth, i.e. 100. Such types of electronic dividers, by means of which pulses can be divided by any integer number, and which operate reliably up to very high frequencies, are sufficiently known according to the prior art, so that a detailed description herein is deemed unnecessary. Reference, however, is made to the book "Waveforms," one of the Radiation Laboratory Series (McGraw-Hill Book Company, Inc., New York) 1949, pp. 556–628. However, the divider may be designed as a divider of a fixed pulse frequency, or may be otherwise a simple type of electronic counter which, upon reaching the preselected number, transmits an output pulse.

The thus obtained pulses in the lines or leads 11 and 14 are now compared with one another in a device 15. This device preferably operates with linear interpolation techniques and determines the deviations of the two pulse sequences from each other. Consequently, the relative rotation, i.e., the indexing deviation or error of the hobbed wheel is also determined. With the aid of suitable methods, pulse sequences may be compared whose recurrence frequencies deviate from each other by an integral multiple. In such cases, because the gear ratios with respect to single-thread hobbing machines are always integral, the factor of both the dividers and the multiplicators can be reduced.

The deviation of a pulse sequence from the rated or desired value generates via the comparator 15 a control voltage. This control voltage cooperates in such a way with subsequently arranged equipment that the deviations will be compensated. The machine in this way adheres to the exact relative position of the indexing discs. As to the method of linear interpolation, reference is made to my copending U.S. patent application Serial No. 793,844, filed Feb. 17, 1959, now U.S. Patent No. 3,056,029.

In FIGURE 2 of the drawings there is shown a typical necessary control circuit. By the references 11 and 14 there is denoted the flowing-in of the pulse information which is obtained on one hand from the cutter rotation, represented by the block 18, or on the other hand from the table drive and control mechanism represented by the block 17. The mutual position is compared in the device 15 (comparator), in which the regulating voltage, i.e. the control quantity 16 is produced, with the aid of which the power table drive and control mechanism 17 is re-adjusted until the desired position on relationship of the pulses 11 and 14 has been established.

The control device (comparator) 15 may be designed to have a proportional, differential or integral behavior, or a mixed characteristic, quite depending on the conditions. Likewise, also the guide and control quantity 11 or 14 respectively, can be reversed. In other words, it is possible to re-adjust the cutter drive instead of the table drive.

With respect to the regulating operation, i.e., for the embodiment of the regulating or control path, e.g. 17, there result, according to the invention, quite a number of possibilities, all of which are schematically shown in FIGURE 3.

Thus, first of all, there may be provided two drives, which are independent of each other, for the two motional quantities of which the one is controllable, i.e. capable of being regulated or controlled in the conventional way either electronically, magnetically or hydraulically.

A small control power for the drive to be controlled will be sufficient when employing the hitherto conventional table drives of a hobbing machine. Gears of this type are well known and are denoted in FIGURE 3 by the square 58. The component parts indicated by reference 21 through 36 do not form part of the gear mechanism of a conventional hobbing machine, but show alternative examples of the embodiment according to the invention.

In addition, e.g. via a differential drive which is indicated in the gear mechanism by the reference 24, a current additional rotation may be produced by a control motor 27 via the crosspiece or strap and the bevel gears 25 and 26 adapted to drive it. The actually fixed and well-known type of variable gear transmission 58, which is set or adjusted in dependency upon the number of teeth of the workpiece, is varied upon initiating the rotation of motor 27. Depending on the direction of rotation of the motor, the transmission ratio will either become smaller or greater. It is obvious that in this way the motor will be capable of compensating the angular position deviations appearing between the shaft 1 and the shaft 5. Preferably the layout of the gear mechanism can be selected in such a way that the control motor 27 will not have to reverse its direction of rotation. In this case the motor, with its rated number of revolutions, will continuously feed-in an additional rotation which may be either enlarged (increased) or reduced (decreased) in accordance with requirements. The transmission ratio between the cutter and the workpiece would be correspondingly dimensioned, either smaller or greater. The power output of the control motor 27 thus is very low, because it only has to provide for additional rotations.

Depending on the constructional layout, the necessary additional rotation is restricted to an angular turning of a few degrees. This turning, instead of being affected by the differential gear 24 and the control motor 27, could be effected by turning the crosspiece of another differential in a simple way with the aid of electro-mechanical means, or else with hydraulic control pistons, as is noted in FIGURE 3 by the differential gear 32 and its corresponding crosspiece 33.

Finally, instead of the above mentioned means, also a synchronous variable ratio transformer of the normal and well-known type ("electric differential") may be inserted into the gear mechanism, as is denoted and indicated by the armature 21 and the field 22. The feeding-in is effected via slip-rings. The internal fields of the variable ratio transformer determine the position of the armature with respect to the external field. In this way there is likewise provided a possibility of introducing a relative rotation to the gear mechanism.

According to the invention it is furthermore possible to compensate the errors or deviations by mounting on the normal machine table 39, which is driven by the worm gear 38, a second table 41 which is turned with respect to the normal table by the amount of the deviation. To this end, the turning arrangement may be operated by the conventional types of mechanical or hydraulic drives. Preferably this may be accomplished by utilizing the magnetostrictive effects or the reversed piezo-effects respectively. In this case the two tables are connected by the elements 40, 40', 40" and 40''', e.g. made of nickel or of any other material having a high magnetostrictive modulus. These elements are surrounded by a coil, the current flux from which can be varied by the control voltage and, consequently, likewise the magnetic field thereof. In this way there is also simultaneously varied the length of said elements, so that the tables 39 and 41 will be turned with respect to one another. When employing the reversed piezo-effect the elements will have to consist of barium titanate or of any other suitable material to which there is applied an electric voltage causing either the expansion or the contraction of the elements. The practical employment of the inventive double table is of advantage especially in cases where such a control facility might be attached to existing machines without causing any considerable alterations.

On one hand, in analogy to the additional turning of the table, the cutter 2 can be displaced or shifted in the axial direction. The necessary movement can be effected via the displacement of an axial bearing or, as is shown in FIGURE 3, via e.g. a lever 42 which is firmly supported in the machine (bearing 43). Since, as a rule, the displacement only concerns a few microns, this may again be effected with the aid of magnetostrictive or piezoelectric means or elements.

The many aforementioned possibilities are supposed to be understood as exemplified embodiments of the underlying idea of the invention. In the course of this the individual means may also be combined. Thus, for example, with respect to the bigger transmission deviations appearing in a slow succession, there may be readjusted a drive, whereas for the smaller deviations appearing at a quicker sucession there may simultaneously be carried out a compensation with the aid of magnetostrictive means.

Analogously the same considerations also apply to other types of two-motion machine tools, i.e. not only to the rotation of workpiece table and hobbing cutter as mentioned in the above example, but also to the rotary motion or rotation of both the table and the feed motion (feeding movement) of the cutter carriage over the width of the workpiece in hobbing machines, the rotations of both the tool and the workpiece in gear shapers, and to the rotational and longitudinal motion of workpieces in thread grinding machines, etc.

However, the hobbing machine control as described hereinbefore does not yet meet all requirements. With the aid of this control it is not yet possible to manufacture helical toothed wheels, and also the shifting method cannot be employed. According to the invention there is provided for these cases a special arrangement in the form of a pulse-subtraction or pulse-addition respectively, which, in its effect, corresponds e.g. to that of the conventional differential gear in hobbing machines for considering the angle of slope.

In accordance with this angle of slope the table has to perform either a positive or negative additional rotation. Thus, in accordance therewith, one of the pulse sequences has to be slightly varied. In accordance with the showing of FIGURE 4 the pulse sequence of the cutter shaft 1 is affected by the indexing disc 3. This sequence of pulses is transferred to a further divider 44 which is adjusted in accordance with both the angle of slope and the cutter feed for delivering additional pulses over the line 45, which are added, via either an adder or a subtractor 46 (quite depending on the angle of slope) to the pulse current 9. The common current 47 is further treated in the way as already described hereinbefore, i.e. is divided in the divider 10, etc. Of course, by the additional pulses there is caused a transmission leap, but this leap may be held within the admissible tolerance. However, it is also possible to derive the additional pulses from another point, e.g. from the feed shaft for the cutter carriage. Means are provided for preventing the additional pulses from coinciding with the pulses 9, so that they will appear during the intervals thereof.

For introducing an additional rotation it is alternatively possible, however, that the scanning point of the pulses 4 is turned in relation to the division, as is denoted by the arrow 48. The same features also apply to the shifting method, in the course of which the cutter is additionally shifted in the axial direction for causing the engagement of new cutting tools. From this additional movement it is again possible to derive impulses, but it is also possible to effect an angular coupling of both the cutter and the scanning of the table divisions.

All of the aforementioned possibilities are aimed at controlling the relative movements of machine tools with respect to a high accuracy. Thereby it is not a requirement that the control voltage as supplied by the measuring or control device 15 and used for the regulation purpose is in proportion with the resulting deviation of the relative movement to be eliminated. On the contrary, in certain cases it may even be desirable or necessary to avoid a proportionality, e.g. in order to avoid oscillations or vibrations.

The more simple problem is concerned with the measurement of relative deviations. To this end only the control voltage 16 as provided by the control device 15, has to be recorded or made visible respectively by a suitable recording device, because this voltage is a measurement for the resulting deviation. When being employed for measuring the deviations, the control device for the control voltage is advantageously supposed to be proportional and, if possible, calibrated in seconds of arc; a requirement which can be easily met with aid of a linear interpolation according to the copending application mentioned hereinbefore.

In FIGURE 5 there is shown the basic arrangement for measuring toothed wheels, the so-called one-flank hobbing gauge test, in which a gauge toothed wheel is in engagement with an object to be tested. The gauge toothed wheel 49 may either be driven by hand or by a motor. The object to be tested 52 is either only slightly retarded so that the flanks of the toothed wheel are applied with a measuring force, or otherwise the object 52 is braked or retarded in such a way that the flank pressure will correspond to the operating conditions.

To both of the shafts there are coupled indexing discs 49' or 52', which are scanned with the aid of the devices 50 or 53 respectively. The pulse divider 51 is adjusted to the number of teeth of the object 52 under test, whereas the divider 54 is adjusted to the number of teeth of the gauge toothed wheel 49, or otherwise to the integer multiples thereof. The resulting pulse sequences are compared in the device 55 and, in the case of a mutual deviation, there is then obtained the measuring voltage 56 which, thereupon, may be recorded or indicated as a measurement for the hobbing deviation (or error).

For achieving higher pulse frequencies an arrangement according to FIGURE 6 may be of advantage. In this arrangement there is used a multiplicator 57 which is set to the number of teeth of the gauge toothed wheel, or to one integral divisor thereof; furthermore there is used a divider 51 which is adjusted to the number of teeth of the object under test.

With the aid of these dividers or multiplicators respectively, it is possible to quickly readjust the control or measuring device to accommodate various numbers of teeth in a very simple manner. Appropriately, the pulse comparison is carried out by the interpolation method according to the parallel application. In this case, the deviation is indicated by units of the indexing interval of the respectively employed indexing discs (about 10,000 divisions along the circumference).

Appropriately, the trains of pulses are so arranged or positioned that the pulses of one train fill the gaps of the other one, which is enabled by means of a relative turning arrangement, e.g. by an angular displacement of one of the scanning devices 50 or 53. These units are displaced until the mean value of the deviation voltage 56 has assumed the desired position. Appropriately, the pulse spacing or interval is chosen to be larger than the greatest hobbing deviation. In the case of 10,000 indexing intervals distributed along the circumference, the greatest hobbing deviation may then amount to $\pm 65''$ (seconds of arc) or, when employing pulse dividers, to the corresponding multiple thereof. When interpolated into 100 parts, which involves no difficulties from the electrical point of view, there would result a measuring deviation of only $\pm 0.65''$ (second of arc), when disregarding the deviation of the division (indexing deviation).

The described gauging of spur gears can be analogously applied to gauging of bevel gears, spiral or helical gears, worm and worm wheels, spur wheel and toothed rack, to threads, as well as to the gauging of divided circles or circular and longitudinal divisions among one another respectively.

Having now described the invention in considerable detail, it will be appreciated that the objects set forth at the outset of this specification have been successfully achieved. Accordingly, what is claimed is:

1. In a method of gauging the rotary movement of at least two meshing toothed wheels comprising the steps of generating separate sequences of electrical pulse in response to rotation of each of said wheels, and then electrically comparing the pulse sequences so generated to provide a gauge signal, the improvement which comprises varying the repetition rate of pulses in one of said sequences in accordance with the number of teeth on one of said wheels and varying the repetition rate of pulses in the other of said sequences in accordance with the number of teeth on the other of said wheels prior to comparing the sequences.

2. A method of gauging the rotary movement of at least two meshing toothed wheels comprising the steps of generating separate sequences of electrical pulses in response to rotation of each of said wheels, such that the pulses of one sequence lie time-wise between the pulses of the other sequence, varying the repetition rate of pulses in one of said sequences in accordance with the number of teeth on one of said wheels and varying the repetition rate of pulses in the other of said sequences in accordance with the number of teeth on the other of said wheels prior to comparing the pulse sequences so varied to provide a gauge signal.

References Cited

FOREIGN PATENTS 839,126  5/1952  Germany.

SAMUEL S. MATTHEWS, *Primary Examiner.*